United States Patent [19]

Yoo

[11] Patent Number: 4,770,559

[45] Date of Patent: Sep. 13, 1988

[54] POSITIONING JOINT FOR FOLDING LADDERS

[75] Inventor: Hoe G. Yoo, Seoul, Rep. of Korea

[73] Assignee: Myung Ho Kim, New Hyde Park, N.Y.

[21] Appl. No.: 106,818

[22] Filed: Oct. 13, 1987

[30] Foreign Application Priority Data

Mar. 31, 1987 [KR] Rep. of Korea .................... 4310/87

[51] Int. Cl.$^4$ ............................................. F16C 11/00
[52] U.S. Cl. ..................................... 403/93; 403/324; 182/163
[58] Field of Search ............... 182/163, 164, 24; 403/92, 93, 324

[56] References Cited

U.S. PATENT DOCUMENTS

| | | | |
|---|---|---|---|
| 1,696,357 | 12/1928 | Johnson | 182/163 |
| 4,577,986 | 3/1986 | Wang | 182/163 X |
| 4,666,327 | 5/1987 | Su | 182/163 X |

Primary Examiner—Andrew V. Kundrat
Attorney, Agent, or Firm—Watson, Cole, Grindle & Watson

[57] ABSTRACT

A positioning joint for a folding ladder comprising a first joint member having a locking device, and a second joint member having a relatively fitted guide-disc plate. The two joint members are relatively pivotable about a common axis and are lockable in a series of predetermined angular positions by engaging the locking device provided on the first joint member in notches formed at the peripheral edge of the other member, under the control of the guide-disc plate.

2 Claims, 5 Drawing Sheets

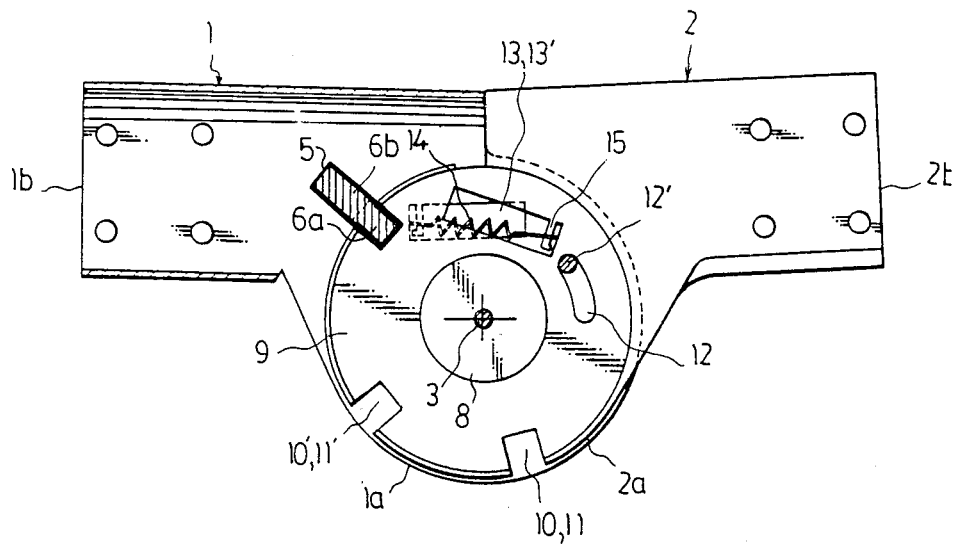
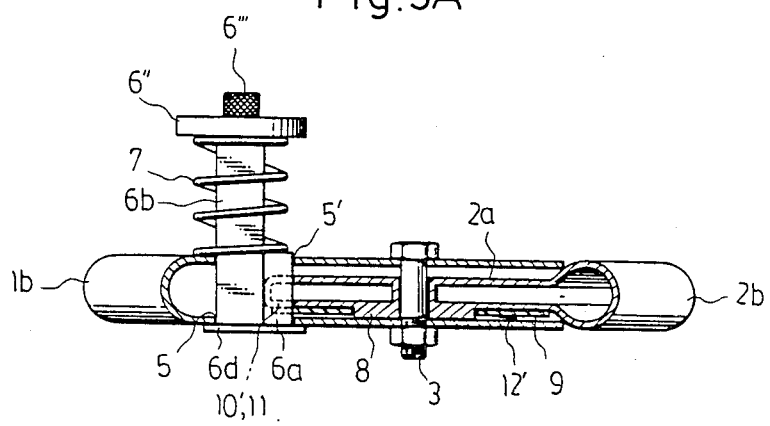
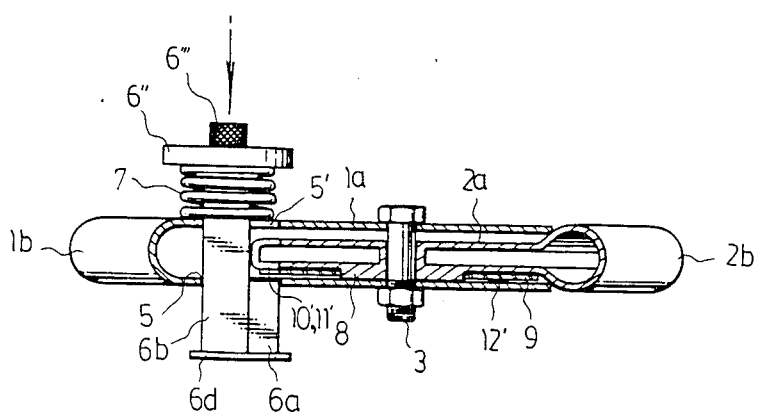

POSITIONING JOINT FOR FOLDING LADDERS

BACKGROUND OF THE INVENTION

This invention relates to a positioning joint for a folding ladder.

In a conventional positioning joint for a folding ladder, the folding or unfolding of the ladder to a desired angular position is performed by aligning holes in side discs and inserting a pin through the aligned holes. A joint of this type has the disadvantage that it is difficult to quickly align the holes simultaneously.

Another prior art joint for a folding ladder utilizes a ratchet. However, users must be concerned about the safety of such a joint because of potential malfunctions of the ratchet.

A further positioning joint for a folding ladder utilizes a U-shaped member as a control means, as set forth in U.S. patent application Ser. No. 073,585. Two joint members are relatively pivotable about a common axis, the joint members being lockable in a series of predetermined angular positions by engaging a spring-biased pawl, provided within one member, in notches formed at the peripheral edge of the other member. A control means in cooperation with a manually operated lever controls the locking and unlocking of the joint.

Although this type positioning joint insures safety in use while being easy to operate, it has a drawback in that its construction is somewhat complex and costly to manufacture, and has a further disadvantage in that it is cumbersome to operate the lever.

SUMMARY OF THE INVENTION

Accordingly, a principal object of the present invention is to provide an improved positioning joint for a folding ladder, which will reduce or eliminate the aforementioned defects, be able to improve productivity with a simple structure, and insure safety in use while at the same time be easy to operate.

According to the present invention, there is provided a positioning joint for a folding ladder, in which two joint members are relatively pivotable about a common axis, and are lockable in a series of predetermined angular positions by engaging a locking device provided within one member in notches formed at the peripheral edge of the other member, under the control of a guide-disc plate.

The invention includes a first joint member having a pair of spaced slots for guiding a transversely slideable locking device, a main-disc portion in the form of a pair of spaced-apart circular plates, and a first tubular portion for fixing the ladder frame therein. A sub-disc portion of a second joint member, and a circular guide-disc plate are located between the spaced plates.

The locking device has a body portion extending through the slots and being longer than the spacing between the circular plates, a stop plate on one end of the body portion, a spring retainer on the opposite end of the body portion, and a spring located between the spring retainer and one side of the first joint member for urging the device into a locked position in which the stop plate bears against an opposite side of the first joint member. A short bar extends inwardly from the stop plate and has a length corresponding to the spacing of the circular plates.

The second joint member has a second tubular portion for fixing the ladder frame therein, and the sub-disc portion is connected to the circular plates for relative pivotal movement about a common central axis between unfolding and folding positions. The sub-disc portion has a plurality of first spaced open notches at its periphery.

The guide-disc plate is mounted for limited rotation about the common axis, and has a plurality of second open notches at its periphery at a spacing and number corresponding to the first notches. The guide-disc plate has an arcuate slot, and the sub-disc portion has a projection pin engaging one end of such slot in a relative position of the guide disc plate in which the first and second notches are misaligned in an unlocked position of the joint members.

A spring interconnects the guide-disc plate and the sub-disc portion for urging the guide-disc plate into the unlocked position.

A free end of the short bar bears against a side of the guide-disc portion in the unlocked position, and the spring effects rotation of the guide-disc plate upon initial unfolding of the joint members until one of the second notches aligns with the short bar. Continued unfolding effects alignment of the one second notch with one of the first notches such that the short bar extends through the aligned notches in a locked position of the joint members.

The free end of the short bar may be wedge-shaped for avoiding engagement with the first notches during a folding of the members together.

Other features of the present invention will become apparent from the following detailed description of the invention when taken in conjunction with the accompanying drawings.

BRIEF DESCRIPTION OF THE DRAWINGS

FIGS. 4A to 4E are sectional views of the FIG. 1 positioning joint illustrating the increments by which the positioning joint is operated; and FIGS. 5A and 5B are transverse sectional views illustrating the operation of the locking device in accordance with the invention.

DETAILED DESCRIPTION OF THE INVENTION

Figure 1:
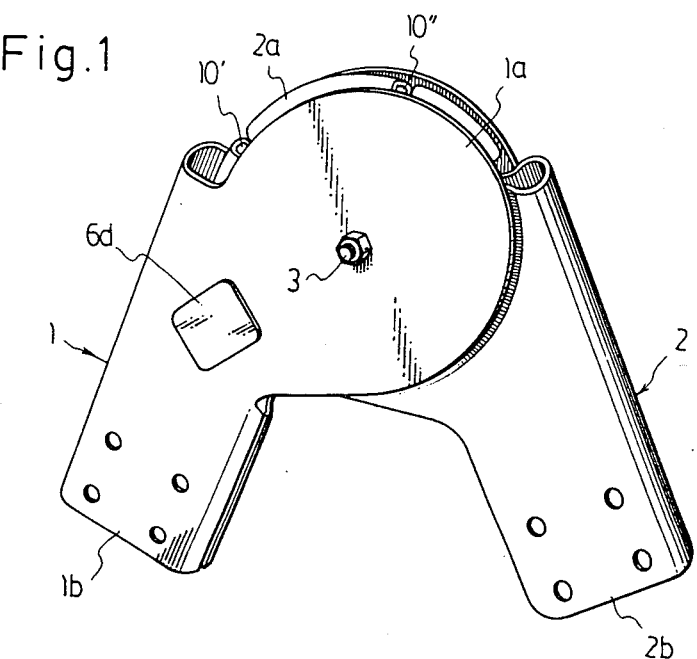
FIG. 1 is a perspective view of the positioning joint for a folding ladder according to the invention.
Figure 2:
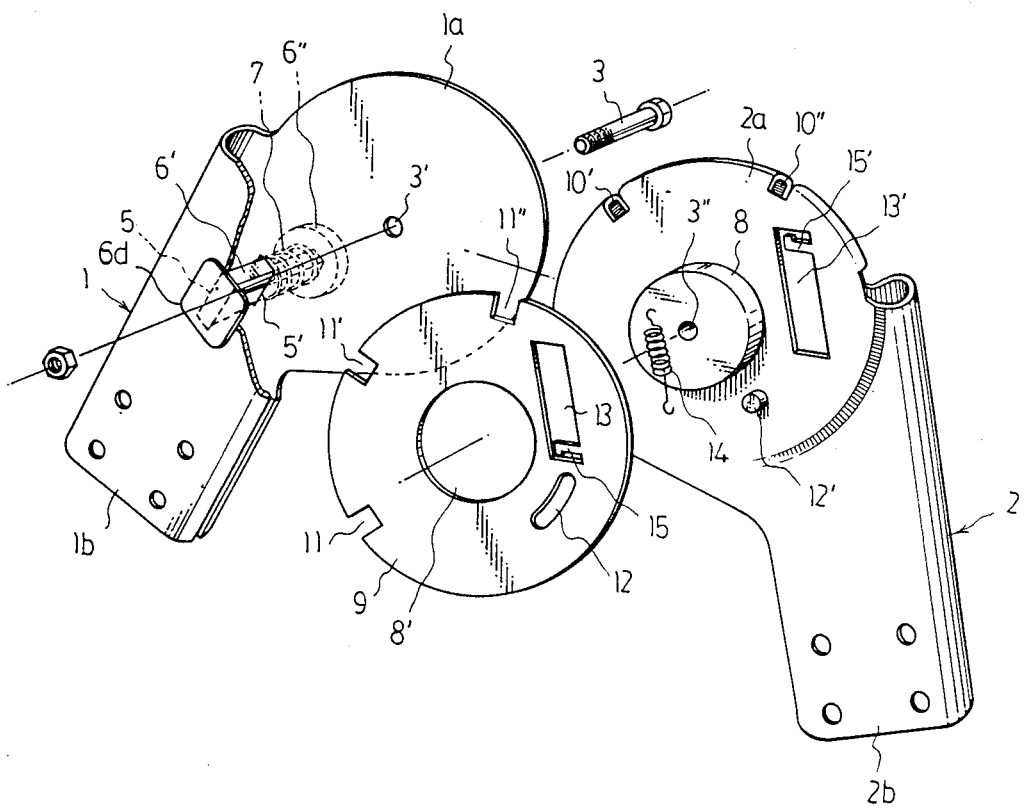
FIG. 2 is a partially cutaway and exploded perspective view of the FIG. 1 positioning joint.

The positioning joint for a folding ladder according to the invention comprises, as shown in FIGS. 1 and 2, a first joint member 1, a locking device 6, a second joint member 2 and a guide disc plate 9.

The construction of the first joint member 1 is similar to a conventional joint member, i.e., it may be formed, for example, of sheet metal pressed into the shape of a main disc portion 1a having two spaced-apart, parallel circular plates each with an axial opening 3', and a first tubular portion 1b in which the upper end of a ladder frame (not shown) is fixed. The first joint member 1 is provided with two slots 5, 5' one in each side of the first tubular portion 1b, so that a locking device 6 can be slideably mounted and operated therein, as shown in FIG. 2.

Figure 3A:
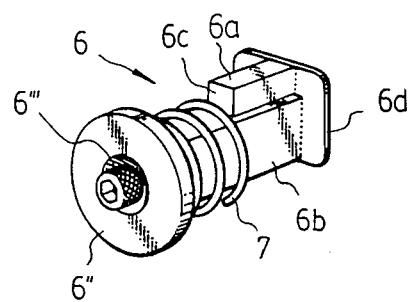
FIG. 3A is a perspective view of the locking device according to the invention.
Figure 3B:
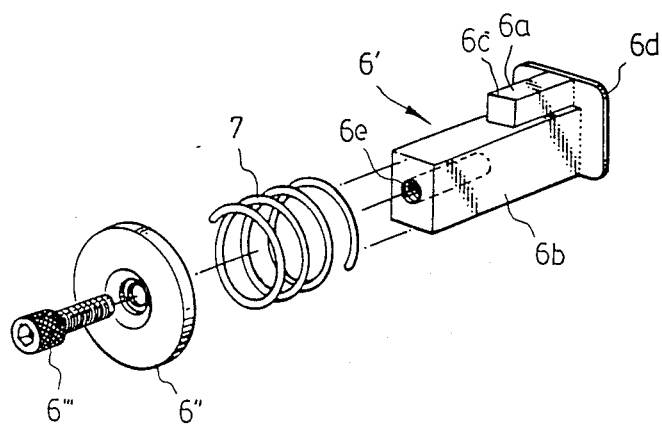
FIG. 3B is an exploded perspective view of the locking device, shown in FIG. 3A.

The locking device 6 according to the invention comprises, as shown in FIG. 3A and FIG. 3B, a body portion 6', a spring 7, a spring retainer 6", and a screw 6'". In the center of the spring retainer 6" is a central threaded hole through which screw 6'" extends for attaching to the body portion 6'. Body portion 6' includes a bar 6b of rectangular cross-section, a rectangular plate 6d fixed to one end of bar 6b, an internally threaded tapped opening 6e at the opposite end of bar 6b, and a short upper bar 6a of rectangular cross-section fixed to the upper surface of bar 6b. The length of bar 6a corresponds to the distance between the two spaced-apart plates of the first joint member (FIG. 5B), and an end of bar 6a is affixed to plate 6d. The other end of bar 6a being wedge-shaped as at 6c so that when the positioning joint is unfolded it may firmly engage the cut-out portions of a guide-disc plate 9, whereas when the positioning joint is folded it may disengage the same.

The locking device 6 is mounted on first joint member 1 by extending bars 6a, 6b through slots 5, 5' (FIG. 5A) so that the plate 6d retains the locking device 6 against first tubular portion 1b. Spring 7 is then placed around bar 6b and screw 6'" with spring retainer 6" in place is threaded into thread 6e.

The second joint member 2 comprises a sub-disc portion 2a with a central axial hole and a second tubular portion 2b in which the upper end of another ladder frame (not shown) is fixed. The sub-disc portion 2a has a circular stepped portion 8 with an axial hole 3", a rectangular slot 13' having a first hook portion 15' for hooking one end of a coil spring 14, a projection 12' formed at the inner surface thereof for limiting the displacement of the guide disc plate 9 by extending into an arcuate slot 12 of the guide-disc plate, and a plurality of notches 10, 10', 10" formed at the peripheral edge.

The guide disc plate 9 has a central circular opening 8', so that the plate can be rotatably fitted to the peripheral surface of the circular stepped portion 8, a rectangular slot 13 having a second hook portion 15 for hooking an opposite end of the coil spring 14, and a plurality of cut-out portions 11, 11', 11" at its peripheral edge. The number and spacing of such cut-out portions corresponds with the number and spacing of notches of the sub-disc portion 2a.

The guide disc plate 9 is coupled to the second joint member 2, that is, the guide disc plate 9 is rotatably fitted by means of the central circular opening 8' to the peripheral surface of the circular stepped portion 8 of the second joint member, and opposite ends of coil spring 14 are hooked onto hook portions 15, 15' whereby the two rectangular slots 13, 13' are superimposed.

The joint members 1 and 2 are pivotably interconnected as a unit by axial bolt 3, that is, the sub-disc portion 2a of the second joint member 2, together with the guide disc plate 9, are located between the spaced pair of circular plates of the first joint member 1, and are pivoted on axial bolt 3 together with the first joint member 1.

The operation of the aforedescribed construction of the positioning joint of the invention will be explained as follows with reference to FIGS. 4A to 4E and 5A, 5B.

Figure 4A:
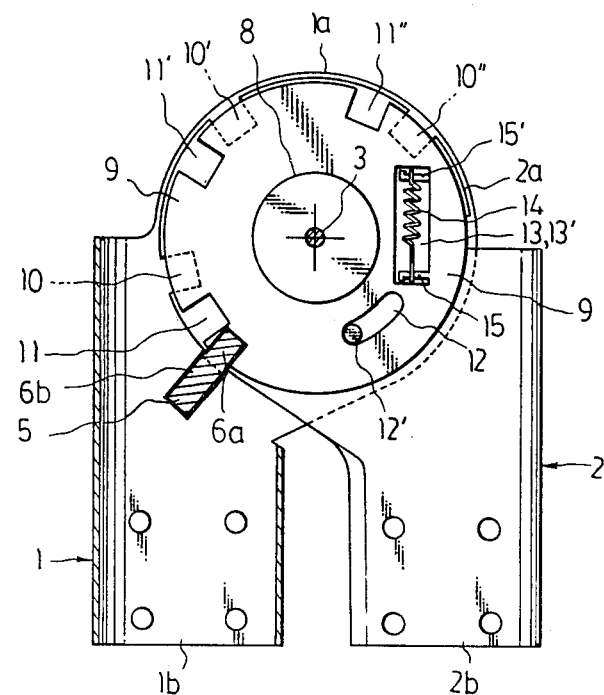
Figure 4B:
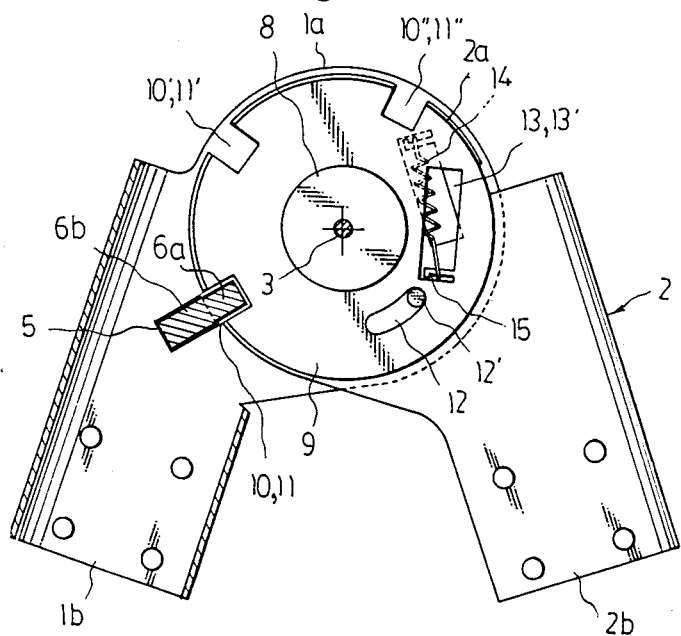

FIGS. 4A and 4B are sectional views of the positioning joint of the present invention, FIG. 4A showing the joint in the unlocked fully closed position, and FIG. 4B showing the joint in which bar 6a of locking device 6 is locked into notch 11 and notch 10.

When unfolding the positioning joint from the fully closed position of FIG. 4A in which end 6c of bar 6a bears against the confronting side surface of plate 9, to the locked position in which bar 6a of the locking device 6 is, as shown in FIG. 4B locked into the cut-out portion 11 and the notch 10, bar 6a of the locking device 6 moves along the smooth side surface of the guide disc plate 9. When the locking device 6 reaches the cut-out portion 11 of the guide disc plate 9, the end 6c of the short bar 6a of the locking device 6 comes in contact with a surface of the sub-disc portion 2a and passes through the cut-out portion 11 due to the resiliency of the spring 7, thereby the guide disc plate 9 which was turning in a counter-clockwise direction with the second joint member 2, turns in a clockwise direction with the first joint member 1. If it is unfolded further, the protrusion 12' of the sub-disc portion 2a moves from the one end of arcuate slot 12 to the other end thereof, and the coil spring 14 is continuously extended. Thereafter, it is not until notch 10 of the sub-disc portion 2a is aligned with notch 11 that the locking device 6 is, as shown in FIGS. 4B and 5A, locked as bar 6a passes through both notch 10 and notch 11 due to the resiliency of spring 7.

Figure 4C:
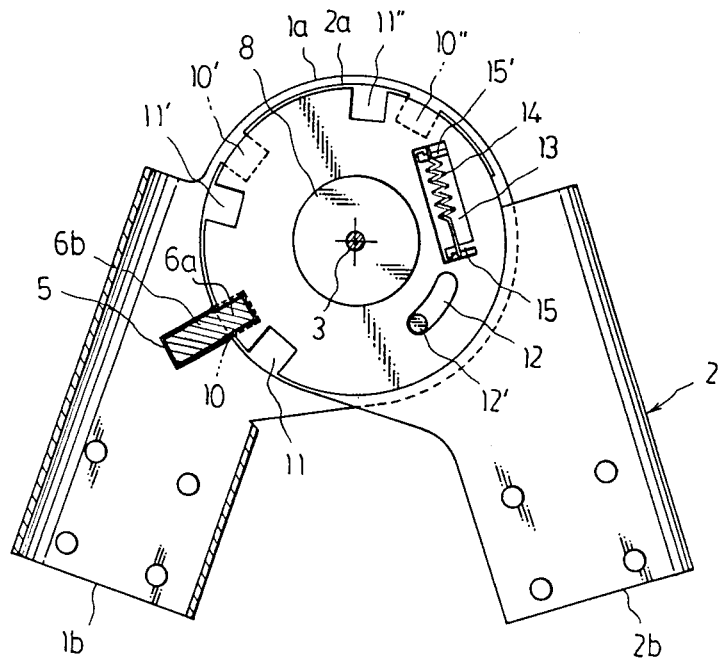

To unfold the positioning joint further to a position in which locking device 6 will be engaged in notch 10', reference is made to FIGS. 4B to 4D and 5A to 5B. Upon manually pushing the spring retainer 6" of the locking device 6 in the direction of the arrow in FIG. 5B, the guide disc plate 9 is unlocked and turned in a counter-clockwise direction by the contractile force of the coil spring 14 until it is, as shown in FIG. 4C, stopped at the opposite end of arcuate slot 12 from the position in FIG. 4B by means of the protrusion 12' of the sub-disc portion 2a. Accordingly, when the compressive force to the spring retainer 6" is released, since the end of the short bar 6a of the locking device 6 is in contact with a surface of the guide disc plate 9, it prevents the locking device 6 from falling back into the cut-out portion 11 and notch 10, and joint members 1 and 2 are permitted to rotate without interference.

Figure 4D:
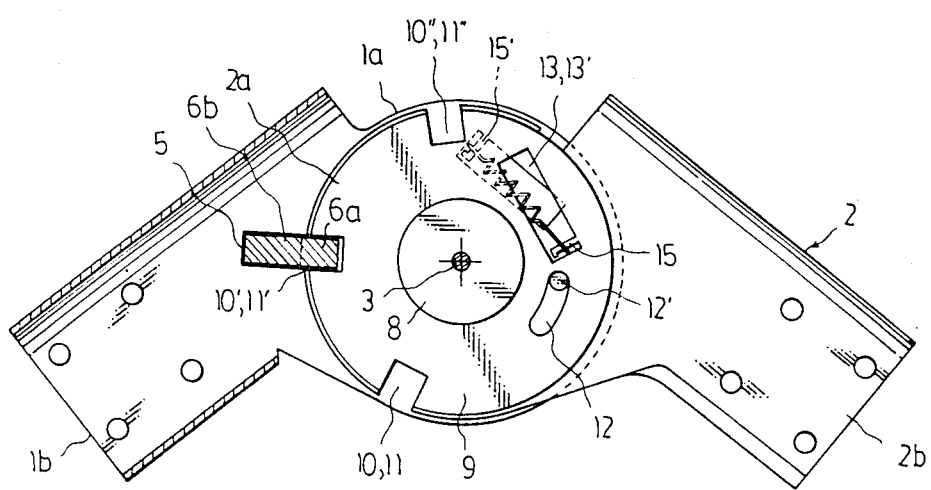

Thereafter, the action is repeated but in a different position, that is, when the locking device 6 reaches notch 11' of the guide disc plate 9, the end of the short bar 6a of the locking device 6 comes in contact with a side surface of the sub-disc portion 2a and thereafter passes through the notch 11' by the elastic force of spring 7, such that the guide disc plate 9 which was turning in a counter-clockwise direction relative to the second joint member 2, turns in a clockwise direction relative to the first joint member 1. If it is unfolded further, the projection 12' of the sub-disc portion 2a moves from one end of arcuate slot 12 to the other end thereof, and the coil spring 14 is continuously extended. Accordingly, it is not until notch 10' of the sub-disc portion 2a is aligned with notch 11' of the guide disc plate 9 that the locking device 6 is locked as bar 6a passes through both notch 10' and notch 11' by the resiliency of the spring 7, as shown in FIG. 4D.

If it is intended to unfold the positioning joint further to engage the locking device 6 in notch 10", as shown in FIG. 4E, the positioning joint can be unfolded completely by the same operating principle as aforedescribed.

The operation of folding the positioning joint is as follows. With reference to FIG. 4E, upon pressing the spring retainer 6" of locking device 6 in the direction of the arrow in FIG. 5B, the guide disc plate 9 is unlocked and turned in a counter-clockwise direction by the contractile force of coil spring 14 until it is stopped at the opposite end of arcuate slot 12 from the position in FIG. 4E by means of the projection 12' of the sub-disc portion 2a. Accordingly, even if the compressive force on the spring retainer 6" is released, since the end 6c of the short bare 6a of the locking device 6 is in contact with a side surface of the guide disc plate 9, it prevents the locking device 6 from falling back into notch 11" and notch 10", and joint members 1 and 2 are permitted to rotate without interference. In this condition when the positioning joint is folded, the end 6c of the short bar 6a of locking device 6 is able to pass by notches 11, 11' and 11" successively without being engaged by them, because its surface is wedge shaped. Meanwhile, each of the notches 10, 10' and 10" are never aligned with the corresponding notches 11, 11' and 11" because projection 12' prevents the rotation of the guide disc plate 9. As a result, the positioning joint according to the present invention can be folded rapidly.

From the foregoing it can be seen that the present invention provides an improved positioning joint for a folding ladder which increases productivity due to simple, solid construction, and insures safety in use while being easy and rapid to operate.

What is claimed is:

1. A positioning joint for a folding ladder, comprising:
    a first joint member having a first circular disc portion and a tubular portion for the reception of a ladder frame, said disc portion comprising a pair of spaced plates, and aligned slots located in said first member;
    a second joint member having a second circular disc portion with first spaced open notches at the periphery thereof, and being positioned between said plates and interconnected therewith for relative pivotal movement about a common central axis between unfolding and folding positions, said second member having a tubular portion on said disc portion thereof for the reception of a ladder frame;
    a circular guide-disc plate positioned between said plates for limited rotation about said common axis, said guide-disc plate having second open notches at the periphery thereof at a spacing and number corresponding to said first notches;
    a locking device comprising a body portion extending through said slots for sliding movement parallel to said common axis, said body portion having a length greater than the spacing between said plates of said first joint member, a stop plate on one end of said body portion, a spring retainer on an opposite end of said body portion, means between said spring retainer and one side of said first joint member for resiliently urging said device into a locked position in which said stop plate bears against an opposite side of said first joint member, a short bar on said body portion extending from said stop plate and having a length corresponding to the spacing between said plates of said first joint member;
    said guide-disc plate having an arcuate slot, and said second circular disc having a projection pin engaging one end of said slot in a relative position of said guide-disc plate in which said first and second notches are misaligned in an unlocked position of said members;
    spring means acting between said guide-disc plate and said second circular disc for urging said guide-disc plate into said unlocked position;
    a free end of said short bar bearing against a side of said guide-disc plate in said unlocked position, and said spring means effecting rotation of said guide-disc plate upon initial unfolding of said members until one of said second notches aligns with said short bar, continued unfolding effecting alignment of said one second notch with one of said first notches such that said short bar extends through said aligned notches in a locked position of said numbers.

2. The joint according to claim 1, wherein said free end of said short bar is wedge-shaped for avoiding engagement with said first notches during a folding up said members together.

* * * * *